Figure 2:
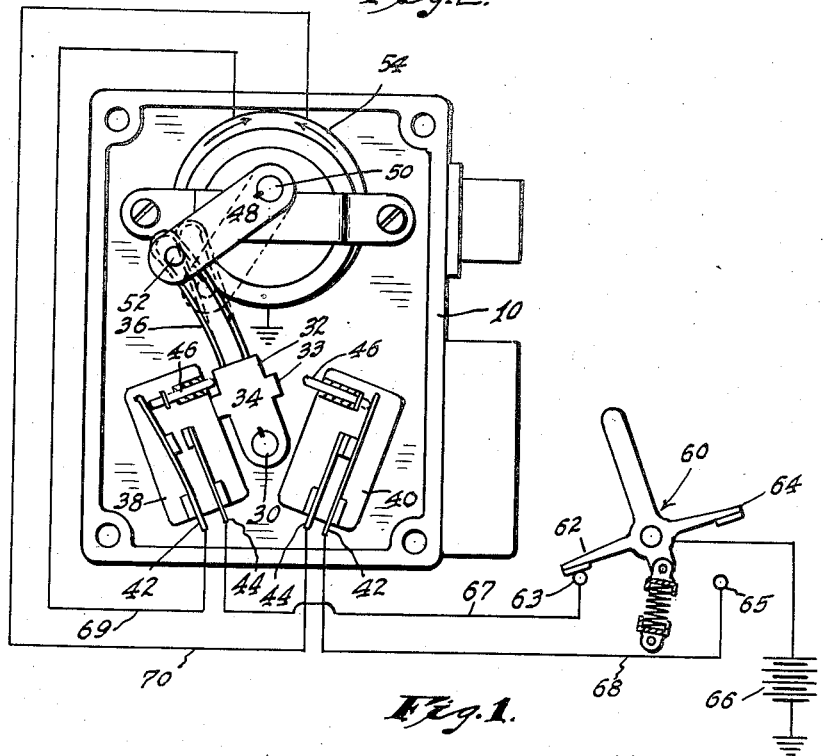

Sept. 9, 1958  R. REGER  2,851,648
VALVE OPERATING MECHANISM
Filed Dec. 9, 1955

INVENTOR.
RAYMOND REGER,
BY
ATTORNEYS.

United States Patent Office 2,851,648
Patented Sept. 9, 1958

2,851,648

VALVE OPERATING MECHANISM

Raymond Reger, Indianapolis, Ind., assignor to The Pierce Governor Company, Inc., Anderson, Ind., a corporation of Indiana Application December 9, 1955, Serial No. 552,155

11 Claims. (Cl. 318—267)

This invention relates to an operating mechanism especially adapted to be driven by a reversible rotary motor and to operate a rotary valve.

It is an object of the invention to provide a motor drive for a rotary valve in which the valve is firmly held in actuated position by stress in a yielding member, preferably a spring lever, and in which the energy stored in the yielding member acts to facilitate starting of the motor to actuate the valve to an opposite position.

In accordance with the invention, a rotary valve or other device which is to be oscillated between two positions is operated by mechanism comprising a lever or crank arm pivotally movable through an acute angle between stopped positions, and operated by a member movable transversely in the plane of movement of the lever and driven by a motor. The motor is de-energized as the lever reaches or approaches a stop position and the operating train contains yielding means which yieldingly opposes and is stressed by final movement of the motor, the energy thus stored being returned to the motor to help start it upon reverse actuation. Such final movement may be overrun movement, in which case the yielding means cushions the stopping of the motor. The yielding means is preferably provided by using a resiliently bendable lever, desirably in the form of a hair-pin shaped spring. The resilient lever is desirably the driven member, and the direction of movement of the driving or operating member desirably makes a small acute angle with the center line of the lever at each stopped position so that overrun movement of the member bends the yieldable lever toward parallelism with that direction of movement. Preferably, the operating mechanism comprises a crank rotatable on an axis parallel with the lever pivot axis in a plane which bisects the angle of movement of the lever, and the operating member is a crank pin which moves in an arc curved away from the pivot axis of the lever, with the relationship such that in the stopped positions of the lever its center line cuts the path circle of the crank pin chordally and the center lines of the lever and crank lie at an obtuse angle. In this case, overrun of the crank bends the yieldable lever toward a tangential relation with the path circle of the crank pin. The parts are preferably arranged so that the crank comes to rest before it reaches a position normal to the bent lever. The lever then always exerts some camming force tending to drive the crank in a reverse direction, but the camming angle between them in stopped position is desirably sufficient, in the light of the irreversability of the motor-crank drive train, to prevent any camming action independently of motor actuation. When a hairpin shaped spring is used as part of the driven lever, the crank pin of the driving crank is conveniently engaged between the two legs of the spring. Stops are provided at the ends of the movement of the spring lever, conveniently in the form of normally closed switches. The motor circuit is interrupted when the spring lever engages a stop, and the motor overruns to stress the hairpin spring in its plane. When the motor is again actuated in a reverse direction, the stored energy helps start the motor.

Figure 1:
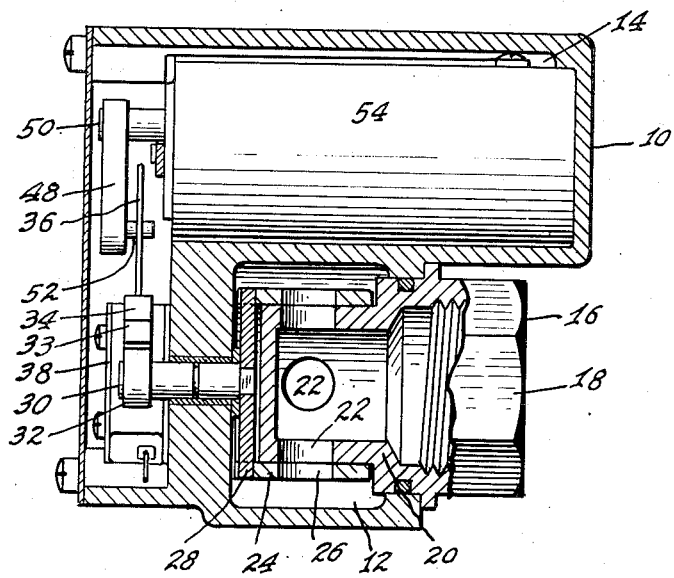

The accompanying drawing illustrates the invention. In such drawing:

Fig. 1 is a longitudinal section of a balanced rotary valve and operating mechanism embodying the invention; and Fig. 2 is a front elevation of the mechanism shown in Fig. 1, with the cover plate removed.

The valve mechanism shown in the drawing comprises a casing 10 which forms a valve chamber 12 and a motor chamber 14. A valve body 16 is removably received in one wall of the casing 10, and comprises an inlet fitting 18 and a valve stud 20. The stud has a central inlet passage which is closed at its inner end, and the cylindrical wall of the stud contains a series of equally circumferentially spaced valve ports 22. A valve sleeve 24 is rotatably mounted on the stud 20 and contains a series of valve openings 26 adapted to register with the ports 22. The sleeve 24 projects beyond the end of the stud 20, and its free end is connected by a floating cross member 28 to an operating shaft 30 journelled in the casing 10. Rotation of the valve sleeve 24 through an angle of the order of 45° carries the valve sleeve openings 26 out of registry with the ports 22 and closes the valve.

The outer end of the valve operating shaft 30 carries a lever 32 having a rigid inner portion 34 and a resiliently bendable outer portion 36 formed of a single piece of spring wire bent upon itself to a hair-pin shape and with the free ends of its spaced legs fixed in the end of the rigid portion 34 of the lever. Stop switches 38 and 40 are mounted at the ends of the throw of the lever 32. These each contain a pair of normally closed switch blades 42 and 44 which are opened when the lever 32 depresses a plunger 46 carried by the switch blade 42. Stop lugs 33 carried at the sides of the lever 32 make positive engagement with the stop switch cases or other abutments when the switches are open.

The lever 32 is oscillated by a crank 48 mounted on a shaft 50 parallel with the shaft 30 and spaced therefrom in the plane bisecting the angle of movement of the lever 32. The crank 48 carries a crank pin 52 engaged between the legs of the spring 36. The crank shaft 50 is driven, either directly or through suitable gearing, by a motor 54 mounted in the compartment 14, the motor unit shown being a high-speed motor combined with reducing gearing in a common case.

As shown in Fig. 2, the motor 54 and switches 38 and 40 are connected in circuits controlled by a manually operable toggle switch 60, with two switch arms 62 and 64 which alternately engage contacts 63 and 65 to control the reversing circuits for the motor 54. The switch arms 62 and 64 are electrically interconnected to a source of current such as a battery 66. The switch contact 63 is connected by a wire 67 to the switch 38 which in turn is connected by a wire 69 to the circuit which drives the motor 54 in a clock-wise direction. The switch contact 65 is connected by wires 68 and 70 to the switch 40 and the motor 54 to control the motor circuit which drives the motor in a counterclockwise direction.

The parts as shown in dotted lines in Fig. 2 are in the positions which they occupy at the time the switch 38 is opened by actuation of the lever 32, the inner end 34 of the lever 32 being at the full limit of its counter clock-wise movement, the spring 36 being straight and unstressed. As the switch opens, the de-energized motor 54 does not immediately stop, but overruns to carry the crank 48 from its dotted line position to its full line position shown in Fig. 2. Its movement between these two positions does not move the rigid inner portion 34 of the lever 32, since this is positively stopped by the stop switch 38. Instead, such movement carries the crank pin upward between the legs of the spring 36 and bends that spring. Normally, the overrun of the motor will carry the lever 48 to about the position shown in full lines in Fig. 2. Abnormal overrun would be stopped by engagement of the pin 52 against the closed end of the spring 36.

The stress in the spring 36 acts to hold the lever 32 and the valve sleeve 24 firmly in actuated open position. Desirably, the crank should stop short of a dead-center position with respect to the stressed spring, that is, should stop with the angle between its center line and the spring less than 90°. The spring will thus have some tendency to cam the crank in a reverse direction. The motor-crank drive train, especially if it contains reduction gearing, is relatively irreversible and tends to resist operation from any such camming force applied to the crank 48. This tendency, and the fact that the crank 48 lies at nearly 90° to the stressed leg of the spring 36 at the end of the overrun, prevents the spring from driving the crank 48 backward from its overrun position. However, when the motor 54 is energized to drive the crank 48 in a counter-clockwise direction from the position shown in full lines in Fig. 2, the energy stored in the spring 36 acts in the same direction and assists in starting the mechanism through its desired movement. A corresponding action occurs at the opposite extreme position of the lever 32.

I claim as my invention:

1. In combination, a driving crank arm and a driven crank arm mounted for rotation on spaced parallel axes and eccentrically interconnected for opposite angular movement with the radii of eccentricity thereof in obtuse angular relation throughout such movement, a motor operatively connected to the driving crank arm, a stop switch actuated by said driven crank arm at the limit of its movement to de-energize said motor, said motor being adapted to overrun when de-energized, said arms and their interconnection containing resilient means which yields to permit limited overrun of said motor and which is thereby stressed, the energy stored therein being returned to the motor on reverse actuation thereof.

2. In combination, a driving crank arm and a driven crank arm mounted for rotation on spaced parallel axes and eccentrically interconnected for opposite angular movement with the radii of eccentricity thereof in obtuse angular relation throughout such movement, a motor operatively connected to the driving crank arm, a stop switch actuated by such driven crank arm at the limit of its movement to de-energize said motor, said arms and their interconnection containing resilient means which is yieldingly stressed at the end of motor operation, the energy stored therein being returned to the motor on reverse actuation thereof.

3. The combination set forth in claim 2 in which said resilient means comprises a spring forming part of one of said arms and resiliently bendable in the plane of its movement.

4. The combination set forth in claim 2 in which said resilient means comprises a hairpin shaped spring carried by one of said arms, and the arms are interconnected by a pin carried by the other arm and received between the legs of said spring.

5. In combination, a driving crank arm and a driven crank arm mounted for rotation on spaced parallel axes, said driven crank arm comprising a pair of spaced radially extending spring members yieldingly bendable in the plane of arm movement, and said driving crank arm having a crank pin thereon received in driving relation between said spring members, the driven arm being movable to a position in which its radial centerline intersects chordally the path circle of said crank pin, a motor for driving the driving arm, a stop switch actuated by said driven arm at its said position for de-energizing the motor, overrun of said motor when de-energized being yieldingly opposed by one of said spring members and stressing the same to store energy therein which is returned to the motor upon reverse actuation thereof.

6. In combination, a driving crank arm and a driven crank arm mounted for rotation on spaced parallel axes, and extending toward each other, said driven arm comprising a hairpin shaped spring with the return bend thereof disposed radially outward and with spaced radially extending spaced legs, said driving arm having a crank-pin received between said legs, a motor for driving said driving arm, a stop switch for de-energizing said motor and actuated by said driven arm at a position of arm movement at which the angle between the centerlines of the arms is a decreasing obtuse angle, final rotation of said motor being yieldingly opposed by said spring and stressing the same to store energy therein for return to the driving arm upon reverse actuation thereof.

7. In combination, a driving crank arm and a driven crank arm mounted for rotation on spaced parallel axes, and extending toward each other, said driven arm comprising a hairpin shaped spring with the return bend thereof disposed radially outward and with spaced radially extending spaced legs, said driving arm having a crank-pin received between said legs, a motor for driving said driving arm, means to stop said driven arm at a position of arm movement at which the angle between the centerlines of said arms is a small obtuse angle whereby further movement of said driving arm yieldingly bends said spring and decreases the angle between said spring and the centerline of said driving arm, and means for de-energizing the motor to stop the driving arm with said spring-centerline angle not less than about 90°.

8. In combination, a lever arm pivotally movable through a limited acute angle, a movable driving member connected to an outer portion of said arm to rotate said arm through said angle, a motor for driving said member, means to stop angular movement of the inner end of the arm, means to de-energize said motor as said arm approaches said stop means, said arm being yieldingly bendable in the plane of its movement, and being yieldingly stressed by final movement of said motor, the energy stored in said arm being returned to said driving member upon reverse actuation thereof.

9. A combination as defined in claim 8 in which said arm in its stopped position lies at a small acute angle to the direction of movement of said driving member and further movement thereof bends said arm toward parallelism with said direction of movement.

10. A combination as defined in claim 8 in which said driving member moves in an arc curved away from the pivot axis of said lever arm, said arm in its stopped position lying at a small acute angle to said arc, and further movement of said driving member bends said arm toward a tangential relation with said arc.

11. Operating mechanism for a valve which is rotatable between open and closed positions, said mechanism comprising a lever arm pivotally movable through an acute angle between stop positions, means to stop said arm in said positions, a crank mounted on a shaft parallel with the pivot axis of said arm in a plane bisecting said angle, a crank pin thereon operatively connected to said arm, said crank and arm being movable through said plane and to each side thereof to extreme positions in which their center lines lie at an obtuse angle to each other, a reversible motor for driving said crank, stop switches for de-energizing said motor when said arm approaches its respective stop positions, said arm being yieldingly bendable in the plane of its movement and being yieldingly stressed by final movement of said crank to bias said arm in said stop positions.

References Cited in the file of this patent

UNITED STATES PATENTS 2,668,267    Chapman    Feb. 2, 1954